Figure 8:
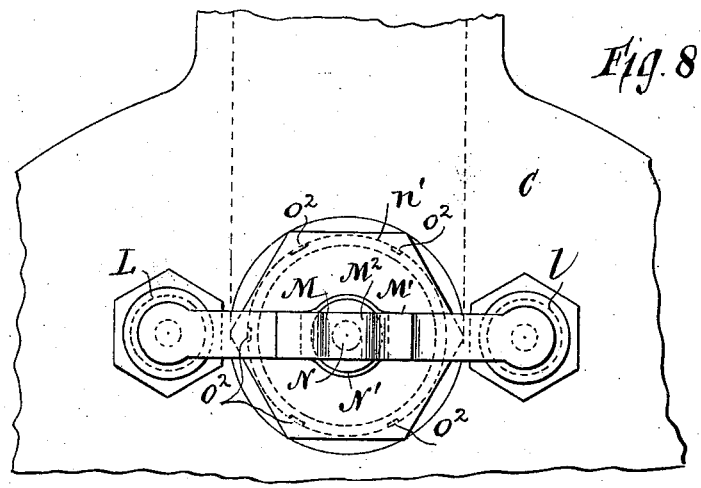

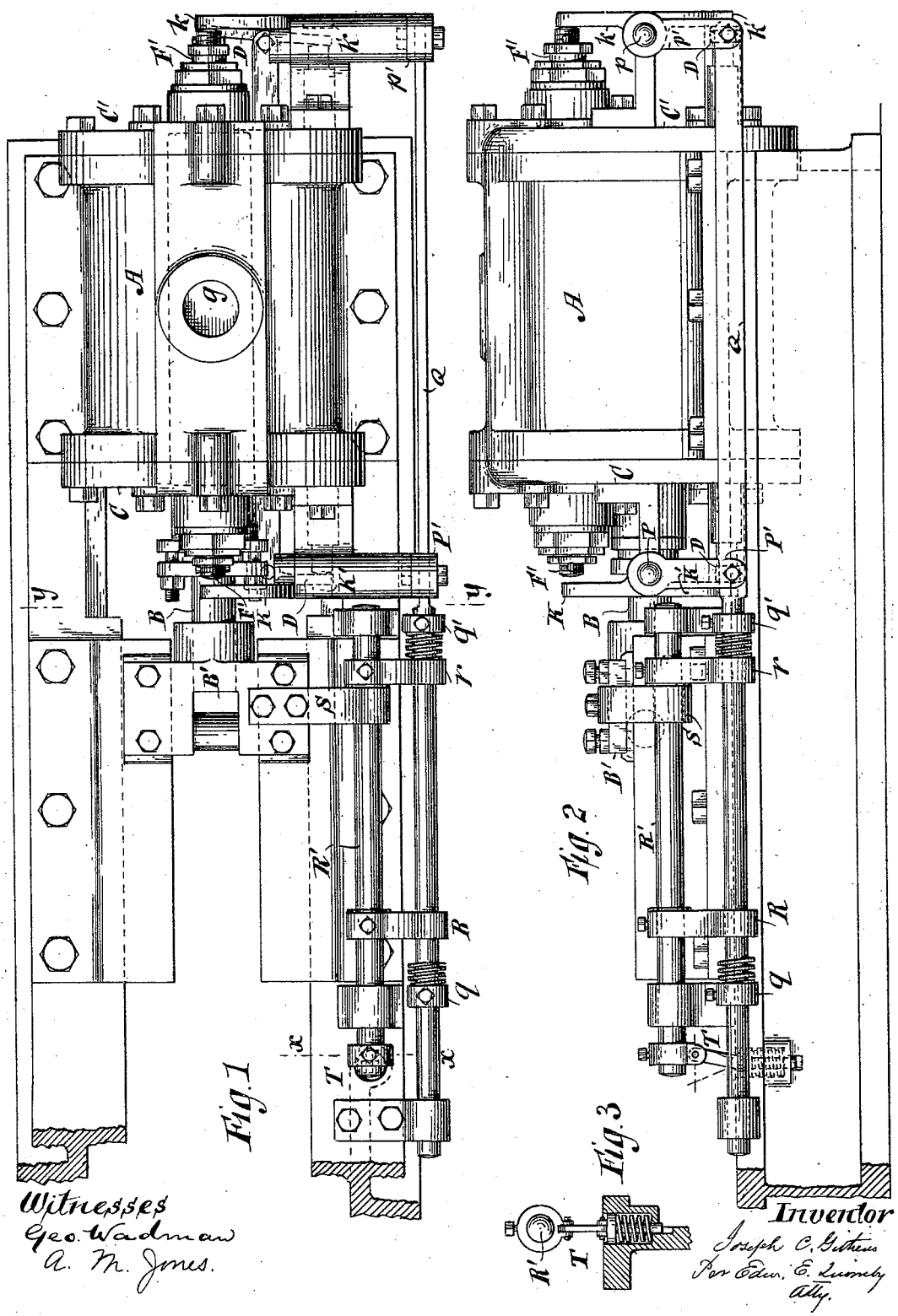

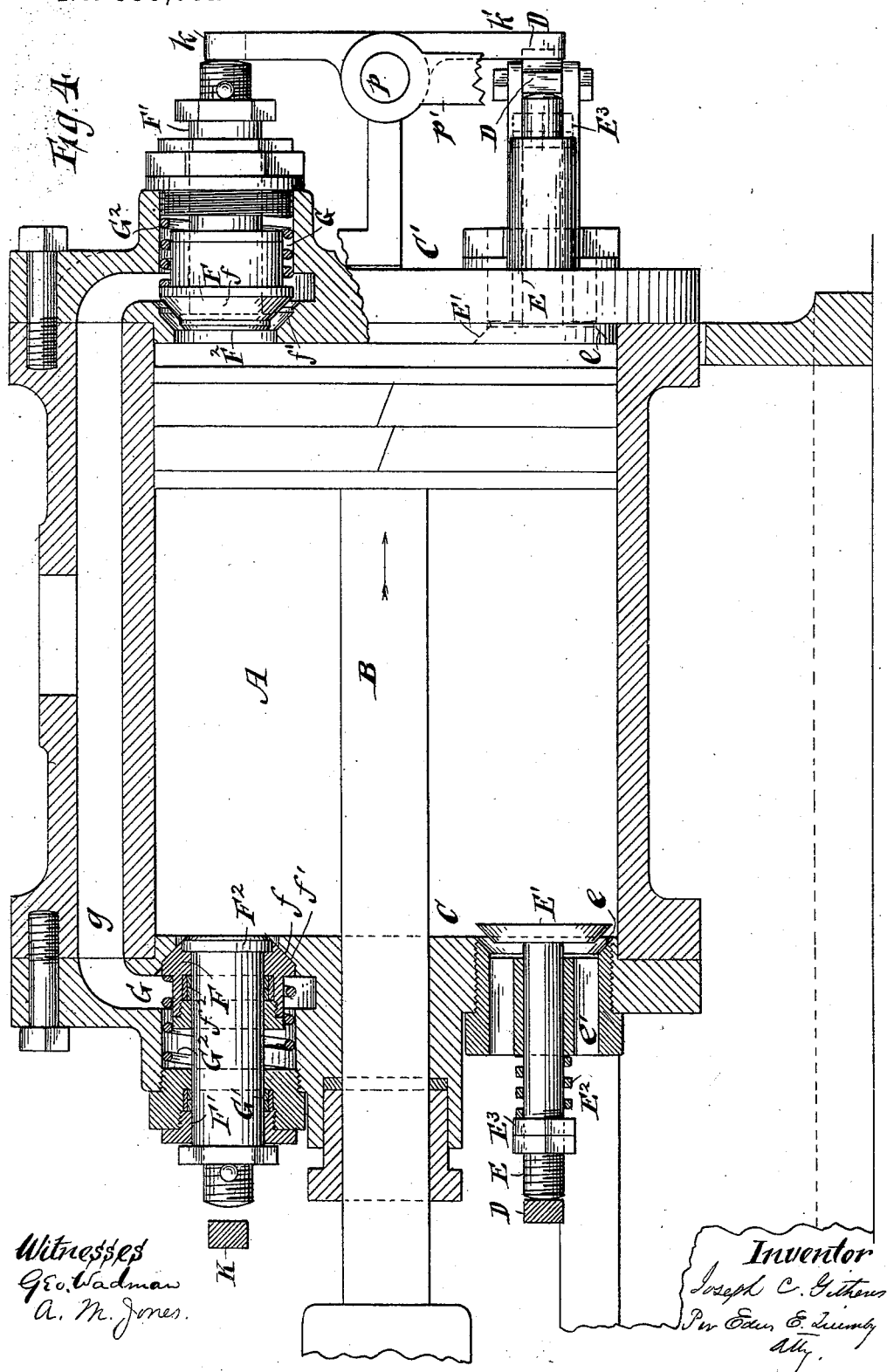

(No Model.) 4 Sheets—Sheet 3.
J. C. GITHENS.
VALVE AND VALVE OPERATING MECHANISM FOR PUMPS.
No. 539,052. Patented May 14, 1895.
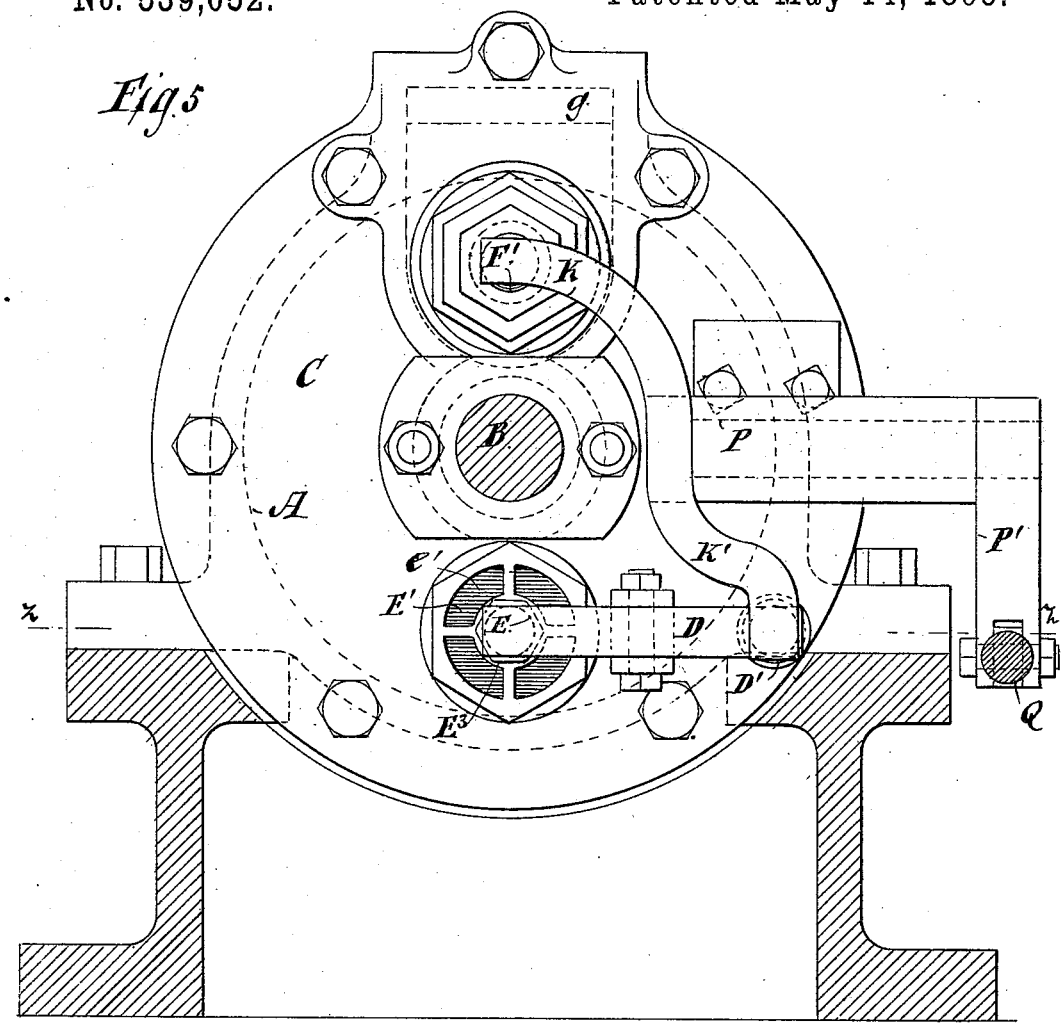
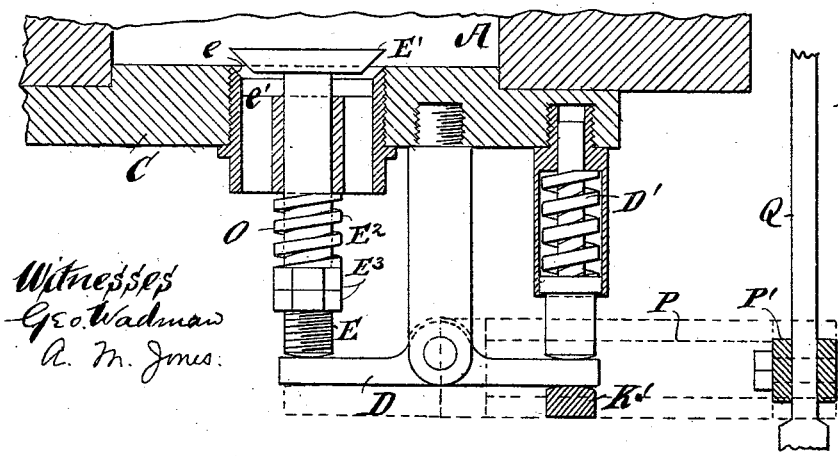
Witnesses
Geo. Wadman
A. M. Jones
Inventor
Joseph C. Githens
Per Edw. E. Lumby
Atty.

(No Model.) 4 Sheets—Sheet 4.

J. C. GITHENS.
VALVE AND VALVE OPERATING MECHANISM FOR PUMPS.

No. 539,052. Patented May 14, 1895.

Witnesses
Geo. Wadman
A. M. Jones.

Inventor
Joseph C. Githens
Per Edw. E. Lunch
Atty.

UNITED STATES PATENT OFFICE.

JOSEPH C. GITHENS, OF RUTHERFORD, NEW JERSEY.

VALVE AND VALVE-OPERATING MECHANISM FOR PUMPS.

SPECIFICATION forming part of Letters Patent No. 539,052, dated May 14, 1895.

Application filed January 19, 1895. Serial No. 535,438. (No model.)

*To all whom it may concern:*

Be it known that I, JOSEPH C. GITHENS, of Rutherford, New Jersey, have invented certain Improvements in Valves and Valve-Operating Mechanism for Pumps, of which the following is a specification.

These improvements which are applicable to a great variety of kinds of force pumps are herein shown as applied to the cylinder of an air compressor. Their object is to effect the opening and closing of the valves, particularly the eduction valve, without shock. The desired result is secured by an organization of mechanism by the operation of which the opening and closing movements of each valve are made to occur while the pressure is substantially the same on both sides of the valve seat. This mechanism embraces an eduction-valve opener and releaser consisting of a piston or pistons actuated in one direction for the opening of the eduction valve by the compressed air in the compression cylinder at that stage in the stroke of the main piston when the air in the compression cylinder reaches the same or nearly the same degree of compression as that of the air in the compressed air reservoir; the piston or pistons of the said eduction-valve opener and releaser being actuated in the opposite direction by a positively moving tappet, for releasing the eduction-valve to the influence of a spring by the resilient force of which the eduction-valve is gently closed at the conclusion of the stroke of the main piston, at which time the pressure is the same on both sides of the valve seat. The induction valve, which remains closed during the movement toward it of the main piston, is opened (as soon as the pressure in the cylinder is reduced by the receding movement of the main piston) by the action of a relatively strong spring which is released from control at the same time that the eduction valve is released to the influence of its spring. The said relatively strong spring, exerting its resilient force upon a suitable lever bearing upon the outer end of the induction valve stem, drives the induction valve inward from its seat in the cylinder head, overcoming, in so doing, the force of a less strong spring which operates to close the induction valve at the conclusion of the receding movement from it of the main piston after the said relatively strong spring has been again compressed and placed under control.

Figure 7:
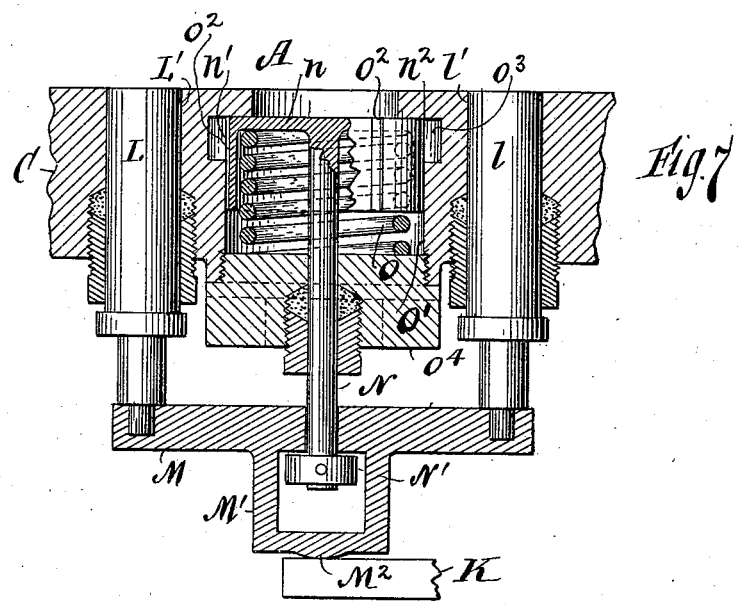

The accompanying drawings illustrating the application of the improvements to a compression cylinder of an air compressor are as follows:

Figure 1 is a top view of the compression-cylinder and its appurtenances. Fig. 2 is a side elevation thereof. Fig. 3 is an end elevation of the tappet-rod and its chock, showing the walls of the cell for containing the chock-spring in section. Fig. 4 is a longitudinal section of the compression-cylinder, showing the valves partly in section and partly in elevation. Fig. 5 is a transverse vertical section taken through the plane indicated by the dotted line $y\ y$ on Fig. 1 and showing one end of the compression-cylinder in elevation. Fig. 6 is a transverse horizontal section upon a portion of the plane indicated by the dotted line $z\ z$ on Fig. 5, showing, partly in elevation and partly in section, the induction-valve-operating mechanism. Fig. 7 is a central longitudinal section of an eduction-valve and of the portion of the cylinder-head in which the eduction-valve is arranged, showing in elevation a modified eduction-valve opener and releaser employing two pistons. Fig. 8 is an elevation of the outer end of the modified eduction-valve opener and releaser shown in Fig. 7.

For the purpose of illustrating the present invention the material parts of the air compressor, shown in the accompanying drawings, which are to be considered, embrace the compression cylinder, A, the main piston, B, the cylinder heads, C and C', each of which is provided with an induction valve and an eduction valve.

The induction and eduction valves in the cylinder head, C, as respects their construction and mode of operation and the construction of their operative mechanisms are the same as the induction and eduction valves in the cylinder head C'. It will therefore be understood that the subjoined description of the construction and mode of operation of the valves in the cylinder head, C, equally applies to the construction and mode of operation of the valves in the opposite cylinder head C'.

For the purposes of this description it will be convenient to call the movement of the main piston toward the cylinder head, C, the "compressing stroke," and its movement in the opposite direction the "return stroke." Using this phraseology therefore;—at the instant, prior to the commencement of the return stroke of the main piston, by which the pressure in the cylinder, A, is reduced, the lever, D, then under the influence of the relatively strong spring, D', and bearing upon the outer end of the adjacent valve stem, E, pushes the induction valve, E', from its seat, e, at the inner end of the valve chamber, e', and thus opens the passage for the admission of external air into the compression cylinder in the rear of and during the return stroke of the piston, at the conclusion of which the lever, D, is released from the influence of the spring D' and the expanding spiral spring, $E^2$, abutting against the outer end of the valve chamber, e', and delivering its thrust against the nut, $E^3$, on the valve stem, E, operates to close the said induction valve.

The eduction valve, when constructed as illustrated in Figs. 1, 2 and 4 consists of the annular plug, F, having its inner face provided with the chamfered edge, f, adapted to fit the valve seat, f', and having upon its outer face the stuffing box, $f^2$, making an airtight sliding fit with the piston, F', which has upon its inner end the fixed collar, $F^2$, adapted to be seated in a suitable recess formed in the inner face of the valve plug F.

The piston, F', extends through the eduction valve chamber, G, and through the stuffing box, G', at the outer end of said valve chamber. An expanding spiral spring, $G^2$, abutting at one end against the inner end of the stuffing box, G', delivers its thrust at its opposite end against the annular shoulder afforded by the portion of the valve plug, F, which extends outside the stuffing box, $f^2$. The eduction valve is opened by the pressure upon the inner face of the collar, $F^2$, and the immediately adjacent portions of the valve plug, F, of compressed air within the cylinder A. For opening the valve, force enough must be applied to overcome the pressure upon the outside of the valve of the compressed air in the valve chamber, G, which corresponds to the pressure in the compression reservoir with which the valve chamber is in communication through the passage g. A small additional pressure equal to, say, one pound more or less, will suffice to overcome the static inertia of the valve, the friction of the piston, F', in its bearings, and the small initial resistance of the valve closing spring $G^2$.

It will be seen that so much of the face of the collar, $F^2$, as equals in area the cross section of the piston, F', is unsupported except by atmospheric pressure upon the outer end of the piston, F', and that the area of the outer face of the eduction valve exposed to back pressure, that is, to the pressure of the compressed air in the valve chamber, G, is less than the combined area of the inner face of the eduction valve and the face of the collar, $F^2$, exposed to the pressure of the compressed air in the compression cylinder. By reason of the greater area of surface thus presented for the action of the compressed air in the compression cylinder, the eduction valve is by this invention forced to open when the air in the compression cylinder reaches the same pressure as that of the air in the valve chamber. So soon as the eduction valve is cleared from its seat, it is relieved from back pressure, and as the outer end of the piston, F', is unsupported except by atmospheric pressure, the greater pressure exerted upon a corresponding area of the inner face of the collar, $F^2$, forces the valve plug, F, toward the stuffing box, G', and compresses the valve closing spring, $G^2$. Therefore the piston, F', engaging the eduction valve by means of its collar, $F^2$, performs the function of an eduction valve opener, which, whatever may be the pressure of the air in the valve chamber automatically opens the eduction valve at that stage in the compressing stroke of the main piston when the air in the compression cylinder reaches the existing degree of pressure of the air in the valve chamber.

At the conclusion of the compressing stroke of the main piston, at which time the pressure is of course the same both in the valve chamber and in the compression cylinder, the piston, F', is forced inward by the appropriate motion of the tappet K. In moving inward the piston relieves the eduction valve, F, from the restraint previously exercised upon it by the collar, $F^2$, and thus performs the function of releasing the eduction valve to the resilient action of the spring, $G^2$, by the expansion of which the valve is made to seat itself without shock upon the valve seat f'. In view of the two functions which it thus performs the piston, F', is herein generically designated an "eduction valve opener and releaser."

The eduction valve opener and releaser may be constructed with two pistons, as illustrated in the modification shown in Figs. 7 and 8 on reference to which it will be seen that two pistons, L, l, are seated in the apertures, L' l', formed in the cylinder head, C, on opposite sides of the eduction valve chamber and provided at their outer ends with suitable stuffing boxes. The inner ends of the pistons, L l, are exposed to the pressure of the air in the compression cylinder A. Their outer ends are affixed to the transverse yoke, M, which is centrally perforated to admit of the passage through it of the eduction valve stem, N, to the outer end of which is affixed the collar, N'.

The middle portion of the yoke, M, is provided with the U-shaped extension, M', affording sufficient clearance for the end of the valve stem N and having upon its outer face the rounded boss, $M^2$, for receiving the impact of the tappet K. The valve stem, N, is of comparatively small diameter and is rigidly connected to the eduction valve.

Opportunity is afforded in Figs. 7 and 8 for the illustration of a modified form of eduction valve, which consists of the disk, $n$, constituting the closed inner end of the hollow cylinder, $n'$. The annular seat, $n^2$, for the eduction valve lies in a plane transverse to the longitudinal axis of the valve stem, N, and is suitably overlapped by the disk $n$.

The valve closing spring, O, is, as will be seen, of smaller diameter than the interior diameter of the cylinder $n'$. The cylinder, $n'$, bears with a sliding fit upon the wall of the valve chamber, O', but is provided upon its exterior surface with the channels, $O^2$, by means of which communication is established between the interior of the cylinder, $n'$, and the valve chamber with the passage, $O^3$, leading to the compressed air reservoir. The valve closing spring, O, abuts against the valve chamber stuffing box, $O^4$, and delivers its thrust upon the disk $n$.

The operation of the eduction valve and the valve opener and releaser illustrated in Fig. 7 is the same as that of the eduction valve combined with an eduction valve opener and releaser employing a single piston inserted through the valve; that is to say, the eduction valve opener and releaser forces open the eduction valve of Fig. 7 whenever the pressure in the compression cylinder reaches the pressure of the air in the valve chamber.

The function of the tappet arm, K, is simply to press the eduction valve opener and releaser inward and thus release the eduction valve at the conclusion of the compressing stroke of the main piston. Concurrently with the rocking movement of the tappet arm, K, for the purpose of thus releasing the eduction valve in the cylinder head, C, the corresponding tappet arm, $k$, is rocked outwardly from the opposite end of the cylinder and is made thereby to occupy a position in which it does not interfere with the outward movement of the valve opener and releaser employed in connection with the eduction valve in the cylinder head C'.

The cylinder head, C, is provided with a radially arranged rock-shaft, P, to which the tappet arm, K, is affixed and with a crank-arm, P'. The cylinder head, C', is in like manner provided with a rock-shaft, $p$, to which the tappet arm, $k$, is affixed and with a crank-arm $p'$. There is also affixed to the rock-shaft, P, another tappet arm, K', the free end of which is adapted to bear upon the end of the lever, D, and to compress the spring, D' and thereby release the induction valve in the cylinder head, C, to the influence of the induction valve closing spring O. Similarly, the rock-shaft, $p$, has affixed to it the tappet arm, $k'$, for releasing the induction valve in the cylinder head, C, to the influence of its valve closing spring $E^2$.

The two rock-shafts, P $p$, are concurrently rocked in their bearings by the endwise movement of the link-rod, Q, pivotally connected at its opposite ends to the crank-arms P' $p'$. The link-rod, Q, is provided with fixed collars, $q$ $q'$, for receiving the impact of the tappets, R $r$, affixed to the tappet rod R'. Just prior to the conclusion of each excursion of the main piston the tappet rod, R', is made to partake of the movement of the main piston by the push against the hub of the tappet, R, or the hub of the tappet, $r$, as the case may be, of the pusher, S, which is affixed to and travels with the cross head, B', of the main piston rod.

The spring chock, T, operates to hold the tappet rod, R', and hence the tappet arms, K $k$ and K' $k'$, stationary in the positions which they have been made to occupy by motion derived from the concluding part of one stroke of the main piston, until they are made to acquire their opposite positions by motion derived from the concluding portion of the ensuing reverse stroke of the main piston.

What is claimed as the invention is—

1. In an apparatus for causing the eduction valve of an air compressor to be automatically opened by the compressed air in the compression cylinder whenever the pressure of such air approximates closely the pressure of the air in the valve chamber whether the pressure in the valve chamber be greater or less, the combination as herein set forth of the eduction valve with a valve opener loosely connected with said valve and suitably packed in the cylinder head, exposed at its outer end to atmospheric pressure and at its inner end to the pressure of the air in the compression cylinder and so proportioned that the combined area of the inner end of the valve opener and the inner face of the eduction valve exceeds to a prescribed extent the area of the surface of the valve exposed to the back pressure of the air in the valve chamber; whereby the eduction valve is automatically opened, at an earlier or later stage in the excursion of the main piston toward the valve, whenever the air in the compression cylinder in front of the advancing piston reaches substantially the same degree of pressure as that of the air in the valve chamber.

2. In an air compressor the combination, as herein set forth, of a valve opener and releaser suitably packed in the head of the compression cylinder, and eduction valve loosely connected with and thereby compelled to partake of the outward movement of said valve opener and releaser, a spring tending to close said eduction valve, a tappet-arm for pushing said valve opener and releaser inward and thereby releasing said eduction valve to the influence of said spring, and connections between said tappet-arm and the main piston rod for causing said tappet-arm to push said valve opener and releaser inward during the concluding part of the movement of the main piston toward the head of the compression cylinder in which said eduction valve is arranged.

3. In an air compressor the combination, substantially as herein set forth, of an induction valve, a spring of relatively moderate strength tending to close said induction valve, a more powerful spring for opening said induction valve, a tappet-arm for holding said more powerful spring under compression during the greater part of the movement of the main piston toward the head of the compression cylinder, in which said induction valve is arranged, and connections between said tappet-arm and the main piston rod for appropriately moving the said tappet-arm during the concluding part of the said movement of the main piston for the purpose of releasing the said more powerful spring from control, and thereby permitting it to exercise its function of opening said induction valve coincidently with the commencement of the movement of the main piston away from the said cylinder head.

4. The combination in an air compressor of an eduction valve provided on its outer face with a stuffing box, a spring tending to close said valve upon its seat, a valve opening piston inserted through said stuffing box and through a stuffing box at the outer end of the valve chamber and provided upon its inner end with a circumferential flange for bearing against the inner face of said eduction valve, the said valve opening piston being so proportioned in diameter that the combined area of its inner end and the exposed portion of the inner face of said eduction valve exceeds to a prescribed extent the area of the surface of said eduction valve exposed to the back pressure of the air in the valve chamber, a tappet-arm for pushing said valve opening piston inward and thereby releasing said valve to the influence of its spring, connections between said tappet-arm and the main piston rod for moving said tappet-arm toward the cylinder head during the concluding portion of the approaching stroke of the main piston and for moving said tappet-arm in the opposite direction during the concluding portion of the receding stroke of said main piston.

5. In an air compressor, the combination as herein set forth of a main compression cylinder, two eduction valves at the opposite ends thereof, an eduction valve opener and releaser for each of said eduction valves, two rock-shafts mounted upon the opposite ends of said cylinder, each of said rock-shafts provided with a crank arm and also with a tappet-arm for pushing inward the valve opener and releaser adjacent to it, a link connecting the said two crank arms and connections between said link and the main piston-rod for communicating endwise movement to said link during the concluding portion of each stroke of said piston whereby a movement of either tappet-arm toward the cylinder head for the purpose of releasing the eduction valve to the influence of its valve closing spring is accompanied by the movement of the other tappet-arm outwardly from the opposite cylinder head for the purpose of clearing said tappet-arm from the path of outward travel of the eduction valve opener and releaser in said opposite cylinder head.

JOSEPH C. GITHENS.

Witnesses:
A. M. JONES,
E. GATTERER.